United States Patent [19]

Berg et al.

[11] Patent Number: 5,829,312

[45] Date of Patent: Nov. 3, 1998

[54] PROGRESSIVE THROTTLE LEVER

[75] Inventors: Norman O. Berg, Roseau; Steven D. Pederson, Warroad; Mitchell D. Johnson, Roseau, all of Minn.

[73] Assignee: Polaris Industries, L.P., Roseau, Minn.

[21] Appl. No.: 653,698

[22] Filed: Feb. 11, 1991

[51] Int. Cl.$^6$ ........................................... F16C 1/10
[52] U.S. Cl. ........................................... 74/502.2; 74/489
[58] Field of Search ........................... 74/489, 501.6, 74/502.2, 518, 522; 123/198 D, 198 DC; 200/61.85, 61.87, 61.88, 61.89

[56] References Cited

U.S. PATENT DOCUMENTS

| | | | |
|---|---|---|---|
| 3,446,091 | 5/1969 | Stocker | 74/513 |
| 3,688,599 | 9/1972 | St. Germain | 200/61.85 X |
| 3,758,736 | 9/1973 | Tanaka | 123/198 DC X |
| 3,845,847 | 11/1974 | Camp | 123/198 DC X |
| 3,881,461 | 5/1975 | Filip | 123/198 DC X |
| 4,138,601 | 2/1979 | Nakamura et al. | 200/61.85 |
| 4,155,418 | 5/1979 | Tremblay et al. | 180/103 BF |
| 4,213,513 | 7/1980 | Beck | 123/198 DC X |
| 4,429,589 | 2/1984 | Stocker | 74/513 |
| 4,532,825 | 8/1985 | Nagano | 74/532 |
| 4,611,500 | 9/1986 | Nagano | 74/532 |
| 4,899,610 | 2/1990 | Bourret | 74/489 |
| 5,078,023 | 1/1992 | Scarborough | 74/489 X |

FOREIGN PATENT DOCUMENTS

| | | |
|---|---|---|
| 973627 | 8/1975 | Canada . |
| 8600555 | 3/1986 | WIPO . |
| 8705576 | 9/1987 | WIPO | 74/489 |

*Primary Examiner*—Leslie A. Braun
*Assistant Examiner*—Khoi Q. Ta
*Attorney, Agent, or Firm*—Fredrikson & Byron, P.A.

[57] ABSTRACT

The invention provides a throttle lever having a mounting block, a lever arm carried by the clock and a cable retained adjacent one end by the lever arm. The lever arm includes a manually engageable flange and is rotatable with respect to the mounting block against the biasing force of the cable through first and second ranges of motion. The first and second ranges of motion correspond to first and second ranges of speeds of the vehicle. The mounting block and/or the lever arm includes a fulcrum which abuts a confronting outer face of the other element as the lever arm passes through the first range of motion. The fulcrum is spaced away from the contronting face through a second range of motion. The force applied to the flange necessary to rotate the lever arm through the first range of motion against the biasing force of the cable is less than the force necessary to rotate the lever arm through the second range of motion.

31 Claims, 6 Drawing Sheets

PROGRESSIVE THROTTLE LEVER

TECHNICAL FIELD

The present invention relates to an improved lever for controlling the throttle of a vehicle.

BACKGROUND OF THE INVENTION

The speed of many vehicles, including recreational vehicles such as snowmobiles, for example, is often controlled by remotely manipulating a throttle. Such throttles often comprise a spring biased valve which selectively restricts flow of fuel and air into the carburetor or engine of the vehicle. The biasing force urges the throttle into an idle position wherein the fuel and air permitted to pass into the engine is limited to that which is necessary to maintain engine operation. The throttle is usually connected to a remote throttle lever by means of a cable. By manually operating this lever to place tension on the cable, one can overcome the biasing force of the spring in the throttle to permit a higher rate of fuel and air flow through the throttle, producing a corresponding increase in the speed of the vehicle.

The throttle control lever is most commonly manually operated, although "cruise control" devices may exert automatic control of these levers. In vehicles which incorporate handlebars, such as motorcycles, snowmobiles and the like, the throttle lever is most commonly mounted on the handlebar at a position wherein it is readily manipulated by the fingers or thumb on one of the operator's hands. Such throttle levers typically include a mounting block affixed to the handlebar and a lever arm rotatably attached to the mounting block. Typically, the lever pivots about a single pivot pin.

The cable is attached at one end to the throttle and at its other end to the lever means. The spring bias of the throttle places the cable in tension and urges the lever arm into an idle position wherein a surface of the lever arm abuts a surface of the mounting block. As an operator applies pressure to the lever arm, the lever arm rotates about its pivot pin and away from engagement with the confronting surface of the mounting block.

In choosing an appropriate spring biasing force for the throttle, one must take into consideration two competing considerations. First, the throttle must be sufficiently responsive for the operator to rapidly slow the vehicle down by simply releasing or reducing the pressure on the lever means. Second, one must also keep in mind that the operator must continually exert sufficient force to overcome the spring bias when operating the vehicle. If the spring bias is too strong, the operator's hand may quickly become fatigued. Accordingly, it would be desirable to provide a throttle lever design which more effectively balances the competing considerations of maximizing responsiveness and minimizing operator fatigue.

Under normal operating conditions, the biasing force of the throttle is transmitted through the cable to the lever means, urging the lever to rotate back to its initial idle position wherein it abuts the confronting surface of the mounting member. However, at times a throttle may become stuck in an open position, and merely releasing the lever means will not cause the throttle to close. This condition obviously presents rather grave dangers to the operator of the vehicle in that the vehicle will not slow down when the operator releases the lever. This danger is particularly prevalent in snowmobiles due to the nature of the environment in which they are operated; the freezing, and often fluctuating temperatures and the presence of snow, sleet, ice and water can induce freezing in the throttle or the throttle cable.

For this reason, many vehicles are often equipped with a manually operated kill switch which terminates operation of the engine. If the operator notices that the throttle is stuck, he may remove his hand from the throttle lever and manually activate the kill switch.

However, the presence of a manually operated kill switch may not always be sufficient to solve the problems presented by a frozen throttle. For instance, if the operator needs to stop quickly, there may be insufficient time to first deduce the fact that the throttle is not working properly and, second, locate and activate the kill switch. A frozen throttle may be particularly problematic when the vehicle is initially started. When the operator starts the engine, a throttle frozen in an open position can cause the vehicle to suddenly accelerate without any appreciable warning to the operator. Thus, it would be desirable to provide a vehicle which includes a throttle lever with means for automatically terminating operation of the engine if the throttle does not respond properly.

SUMMARY OF THE INVENTION

The present invention provides a throttle lever having a lever arm carried on a mounting block. The lever arm and the mounting block both include confronting outer faces, and at least one fulcrum is provided on at least one of these confronting faces. In one preferred embodiment, the lever arm may be rotated with respect to the mounting block through first and second ranges of motion. In a preferred embodiment, the fulcrum on one of the confronting faces abuts the other face through the first range of motion and is spaced away from the other face through the second range of motion.

A cable extends between the lever means and the throttle of the vehicle, and the position of the throttle may be manipulated via the cable by manually manipulating the lever arm. The cable biases the lever arm toward an idle position wherein the confronting faces on the lever arm and the mounting block abut one another. The first and second ranges of motion are defined such that the force necessary to move the lever arm against the biasing force of the cable is less through the first range of motion than that necessary to move the lever arm through the second range of motion.

The lever arm or the mounting block may include a pin while the other of the lever arm or the block may include an arcuate slot. A portion of this pin is retained in and is slidable within the arcuate slot as the lever arm pivots about the first pivot axis. The arcuate slot desirably includes an abutment which the pin may pivotally engage to define an axis, about which the lever arm may pivot through the second range of motion.

In a particularly preferred embodiment, the throttle lever is provided with safety means for terminating operation of the engine. The safety means may simply comprise a manually operated kill switch placed on the throttle lever at a position readily accessible to the operator of the vehicle so that engine operation may be terminated by manually depressing the kill switch. In a preferred embodiment, however, the safety means is capable of both detecting an insufficient biasing force in the cable, which may indicate that the throttle is frozen in position, and stopping operation of the engine if insufficient tension is detected. This safety means may comprise a pair of pressure sensitive detectors, with one such detector being associated with each of the first and second ranges of motion. If the pressure of the lever arm against the mounting block as measured by these detectors does not exceed a certain minimum threshold, indicating that the cable is not exerting a sufficient biasing force on the lever arm, the detectors will automatically terminate operation of the engine.

DETAILED DESCRIPTION OF THE PREFERRED EMBODIMENTS

Figure 1:
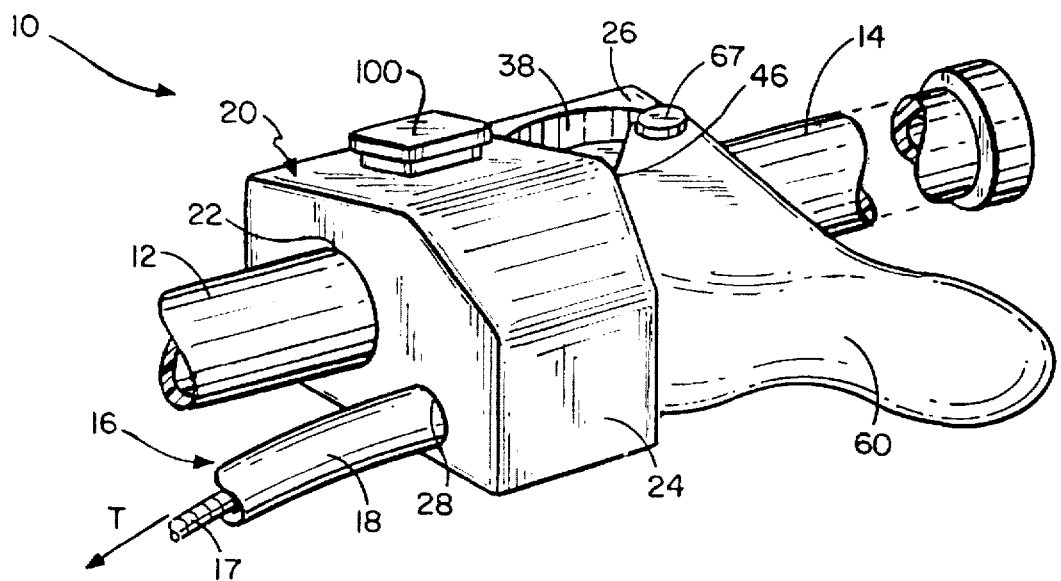
FIG. 1 is a partially broken-away perspective view of a throttle lever of the invention.

A throttle lever of the invention is depicted in FIGS. 1–8. Although the lever may be attached to a vehicle at any desired location, it is preferably located at a position remote from the vehicle's throttle. If the vehicle includes handlebars for steering, as do snowmobiles, for example, the throttle lever 10 may be mounted on one of the handlebars, such as handlebar 12.

The throttle lever is desirably positioned along the handlebar 12 adjacent the hand grip 14, which the operator commonly grasps when using the vehicle. This places the throttle lever in a position in which the operator may readily manipulate the lever arm 60. A cable 16 may be attached adjacent one end to the throttle of the vehicle and adjacent the other end to the throttle lever. Such cables are known in the art and are most often Bowden cables, which comprise a stranded metal core wire 17 slidably retained in a flexible, non-compressible sheath 18 The throttle is desirably biased, such as by means of a spring, toward an idle or closed position, and this throttle bias applies a tension, depicted as arrow "T" in the drawings, on the cable's core wire 17. By manually manipulating the lever arm 60, such as by applying pressure with a thumb, the operator may control the vehicle's throttle via the cable 16.

A throttle lever 10 includes a mounting block 20 for attaching the throttle lever to the vehicle at the desired location. If the throttle lever is to be attached to a handlebar 12 of the vehicle, an elongate orifice 22 (best seen in FIG. 5) may be provided in the mounting block for receiving a portion of the handlebar. Once properly positioned, the mounting lever may then be affixed to the handlebar by known means, such as by means of a bolt threaded into a hole (not shown) in the mounting block and tightened against the handlebar.

The mounting block 20 generally comprises a body 24 and a lateral extension 26 which extends generally laterally of the body 24, i.e., generally parallel to the axis of the handlebar 12. The body 24 may be of any desired configuration; FIGS. 1–6A depict one preferred shape. In this embodiment, the body includes a port 28 (best seen in FIGS. 5 and 6A) which may extend through a portion of the body. A portion of cable 16 may be passed through and slidably retained in this port 28. If so desired, a portion of the port 28 spaced away from the lever arm 60 may be provided with a lip 30 which may abut an end of the sheath 18 of the cable to restrict its movement. If the cable 16 includes a bead 19, as shown, a channel 32 may extend from the port 28 radially outwardly through the body. It is preferable that the opening of the port 28 is smaller than the bead 19 to ensure that the cable does not slip through the port. By providing this channel 32, the bead may be preformed on the core wire 17 and a portion of the core wire behind the bead may simply be passed through the slot into the port 28.

Figure 6A:
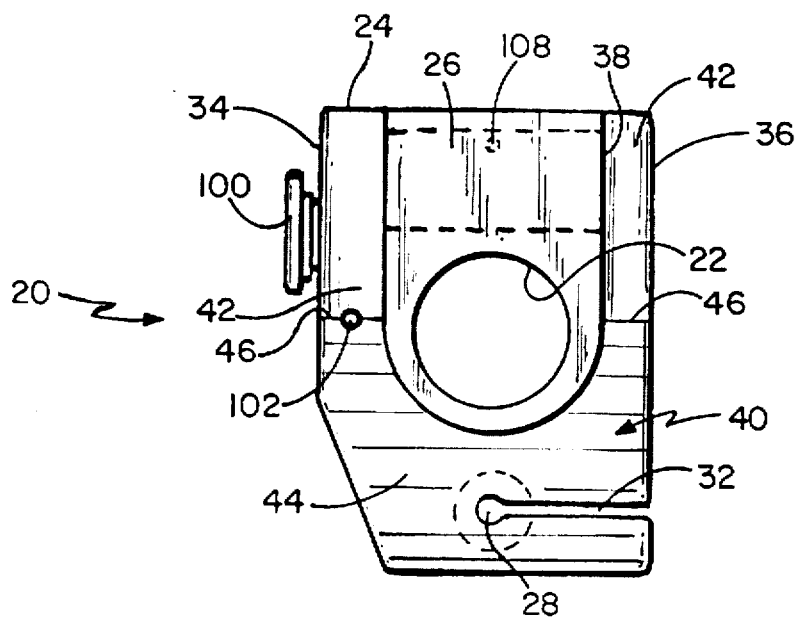
FIG. 6A is an end view of the mounting block of FIG. 1.

As shown in FIG. 6A, the lateral extension 26 is desirably both narrower and shorter than the body 24. In this preferred embodiment, the orifice 22 for receiving the handlebar 12 also passes through the extension 26. The lateral extension may also include an arcuate slot 38 spaced outwardly of the body 24 which passes through the entire width of the extension. As explained in more detail below, a portion of a pin 67 which extends through the lever arm 60 is received in and is slidable within the slot.

The portion of the body 24 that is wider and longer than extension 26 defines a confronting outer face 40 on the body (best seen in FIG. 6A). The confronting face 40 desirably is substantially perpendicular to the extension 26 and to the front and back faces (34 and 36), respectively, of the body and may be generally flat in a direction between the front and back faces 34, 36. The confronting face 40, which comprises a portion of the entire exterior surface of the mounting block 20, may be generally U-shaped and include a pair of generally parallel leg portions 42 disposed on either side of the extension 26 and a base 44, a portion of which is disposed generally below the extension. In one preferred embodiment, the legs 42 meet the base 44 at a predetermined angle to define a fulcrum 46 for pivotally engaging the lever arm 60, as explained more fully below.

A throttle lever 10 of the invention also includes a lever arm 60 which is rotatably carried by the mounting block. The lever arm comprises a base 62 and a manually engageable flange 68. The flange may extend generally downwardly away from the base in the direction of the hand grip 14 of the handlebar 12 when the lever arm is in its idle position (depicted in FIGS. 1 and 2). This permits the operator to readily engage the flange 68 with a thumb while maintaining a grasp on the handgrip 14.

The lever arm also includes at least one leg (or limb) 64 which extends generally upwardly from the base 62. In a preferred embodiment, the lever arm is bifurcate and has two generally parallel legs. The legs desirably are spaced apart sufficiently to receive the lateral extension 26 of the block 20 therebetween with enough space between the legs and the extension to permit the lever arm to move freely with respect to the extension. Each leg is provided with an aperture 66 in which an end portion of a pin 67 may be retained. In the embodiment shown, this pin extends across the space between the two legs and is slidable within the arcuate slot 38. Alternatively, the pin may be affixed to the extension 26 and protrude outwardly from both sides of the extension; each of the two protruding ends of the pin may be received in an arcuate slot formed in each of the legs.

In an alternate embodiment, the lever arm 60 could be provided with a single leg 64 rather than a pair of parallel legs as shown. In this embodiment, the lateral extension 26 would comprise two parallel, spaced-apart halves, and the single leg 64 of the lever arm would be slidably received between these two halves. The pin 67 would pass through an aperture 66 in the leg and be slidably received in an arcuate slot formed in each half of the extension 26. As in the previous embodiment, the pin may instead be affixed to the extension and be slidably received in an arcuate slot which passes through the leg 64.

Figure 6B:
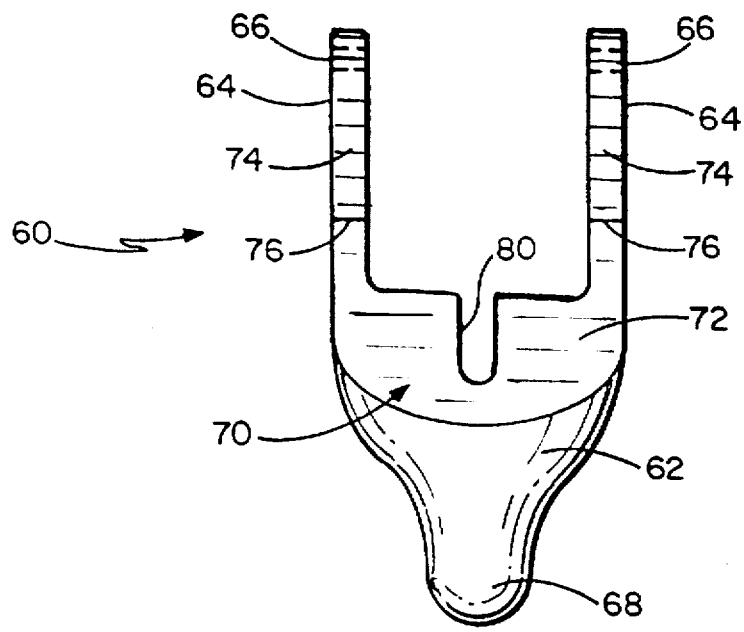
FIG. 6B is an end view of the lever arm of FIG. 1.

As best seen in FIG. 6B, a portion of the outer surface of the lever arm disposed adjacent the body 24 of the mounting block 20 defines a confronting outer face 70. The confronting face 70 includes a base portion 72, which at least in part comprises an outer face of the base 62, and two leg portions 74, which comprise an outer face of a portion of the legs 64. Although this confronting face 70 may be substantially planar, in a preferred embodiment the base portion meets the leg portion at a pre-determined angle to define a fulcrum 76 on the confronting face 70.

The lever arm desirably includes means for retaining an end portion of the core wire 17 of the Bowden cable 16. In the embodiment shown in FIGS. 5 and 8, the core wire is provided with an enlarged diameter bead 19 at one end and the lever arm includes a notch 80 through which a portion of the core wire 17 may be passed. The notch 80 may be of any desired shape, but it should be narrow enough to prevent the bead 19 from passing therethrough. This permits the lever arm to engage and retain the bead so that manipulation of the lever arm by the vehicle's operator can pull the core wire 17 axially with respect to the sheath 18 against the spring bias of the throttle. A projection 82 may be employed in the notch 80 to abut an upper portion of the bead 19 and prevent the bead from slipping upwardly out of engagement with the notch 80.

Figure 2:
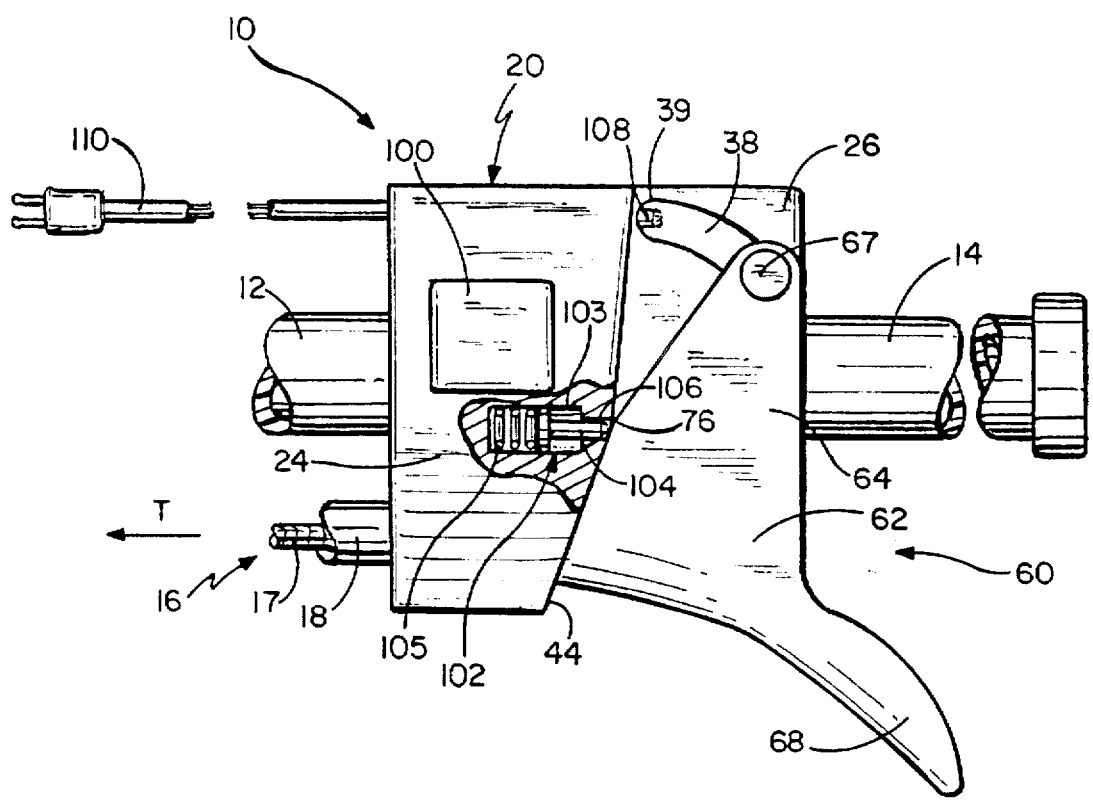
FIG. 2 is a partially broken-away side view of the throttle lever of FIG. 1 showing the throttle lever in its idle positions

In operation, the lever arm 60 is carried by the mounting block 20 and is biased by cable 16 toward an idle position, which is shown in FIGS. 1 and 2. In this idle position, the base portion 72 of the lever arm's confronting face 70 abuts the base 44 of the mounting block's confronting face 40. A fulcrum is provided on either the confronting face 40 of the mounting block or on the confronting face 70 of the lever arm, or both. This fulcrum abuts the opposite confronting face throughout a first range of motion of the lever arm.

When the operator presses the lever arm, it rotates out of its idle position. The biasing force of the cable still acts against the lever arm to urge it toward the mounting block. By providing a fulcrum on either the lever arm or the mounting block (or both), the lever arm will pivot about the point of contact between the fulcrum and the other confronting face. Although the fulcrums depicted in FIGS. 1–7 are all angular in shape, it is to be understood that this is not necessary; instead of presenting a relatively sharp angle, as shown, the fulcrum may instead present a more gentle curve.

If an angular shape is employed, however, the apex of the fulcrum will generally remain in contact with one site on the opposite confronting face as the lever arm rotates away from idle, with this site defining a pivot axis about which the lever arm turns. If a more gentle curve is utilized, the contact location between the fulcrum and the opposite confronting face will move along the surfaces of the fulcrum and the opposite confronting face rather than remain stationary. Nonetheless, the lever arm will still turn with respect to the mounting block about the point of contact therebetween as this contact shifts.

In the embodiment shown in FIGS. 1–6, both the confronting face 40 of the mounting block and the confronting face 70 of the lever arm include a fulcrum (46 and 76, respectively) which is angular in shape. The two fulcrums are positioned on their respective confronting face such that they substantially engage one another when the lever arm is at or near its idle position. As the lever arm 60 is rotated out of its idle position, the two fulcrums substantially abut one another and remain in a substantially abutting relationship throughout a first range of motion. These two fulcrums generally create a single line of contact between the block and the lever arm as the lever arm rotates with respect to the block, and this line of contact defines a first pivot axis about which the lever arm pivots. The angles of the two fulcrums may be varied as necessary to produce the desired first range of motion. In one preferred embodiment, for example, the fulcrum on the mounting block defines an angle of about 174 degrees and the fulcrum on the lever arm defines an angle of about 170 degrees. These fulcrums therefore deviate about 16 degrees, in total, from a flush abutment between the confronting faces, producing a first range of motion of about 16 degrees.

Figure 7:
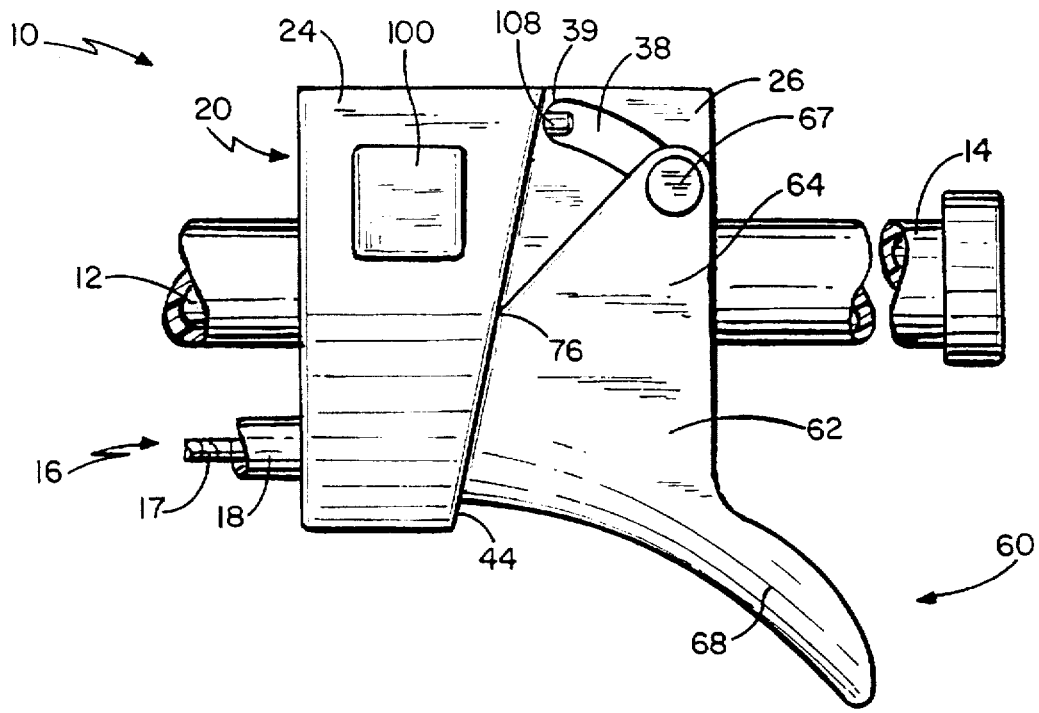
FIG. 7 is a side view of an alternative embodiment of a throttle lever of the invention showing the throttle lever in its idle position.

A particularly preferred embodiment of a throttle lever according to the present invention is shown in FIG. 7. In this embodiment, only the confronting face 70 of the arm includes a fulcrum 76; the confronting face 40 of the block 20 is substantially planar. This fulcrum may be angular in shape with the leg portions 74 meeting the base portion 72 of the lever arm's confronting face at an angle of between about 157 degrees and about 137 degrees, with an angle of about 147 degrees being preferred. The confronting face 70 of the arm therefore deviates from a planar, i.e. 180 degree, surface by between about 23 degrees and about 43 degrees, with a deviation of about 33 degrees being preferred; this produces a first range of motion ranging from about 23 degrees to about 43 degrees, with about 33 degrees being preferred. The apex of this angular fulcrum abuts the confronting face 40 of the mounting block through the first range of motion of the lever arm. As in the previous embodiment, this fulcrum generally contacts the confronting face 40 of the mounting block along a single line, and this line defines a first pivot axis about which the lever arm pivots with respect to the block 20.

The arcuate slot 38 in the lateral extension 26 of the mounting block is shaped to permit the pin 67 to slide within the slot as the lever arm passes through its first range of motion. In a throttle lever wherein the lever arm pivots with respect to the block about a single pivot axis, e.g., wherein the fulcrum or fulcrums are angular in shape, this arcuate slot may be spaced radially outwardly of that first pivot axis.

Figure 3:
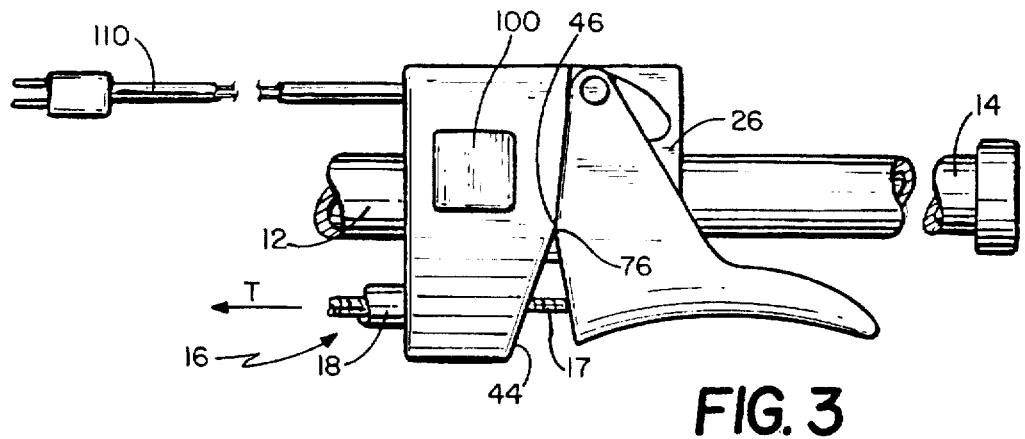
FIG. 3 is a side view of the throttle lever of FIG. 1, showing the throttle lever at the end of its first range of motion.

The lever arm continues to pivot about its line of contact with the mounting block throughout its first range of motion. In the embodiments shown in FIGS. 1–7, this means that the arm turns about the first pivot axis defined by the fulcrum against the opposite confronting face. The lever arm's position in first range of motion is depicted in its initial, idle end in FIG. 2 and adjacent the final end of the first range in FIG. 3. As shown in FIG. 3, turning the lever arm through this range axially displaces the core wire 17 with respect to the sheath 18 of the cable. In so moving the lever arm, the operator causes the throttle to be opened wider and the speed of the vehicle will increase. At the end of the first range of motion, the lever arm begins to enter a second range of motion, which extends to the fully-opened position illustrated in FIG. 4.

As noted above, an arcuate slot 38 may be formed in the lateral extension 26 and the pin 67 carried by the legs 64 of the lever arm may slide within this slot through the first range of motion. This arcuate slot 38 may include an abutment 39 adjacent one end, and a pin 67 may pivotally engage this abutment when the lever arm reaches the end of its first range of motion. The abutment may be of any suitable shape for rotatably receiving the pin. In a preferred embodiment, the abutment comprises an end of the arcuate slot 38 and is semi-circular in shape with a diameter slightly greater than that of the pin to permit free movement of the pin against the abutment.

Figure 4:
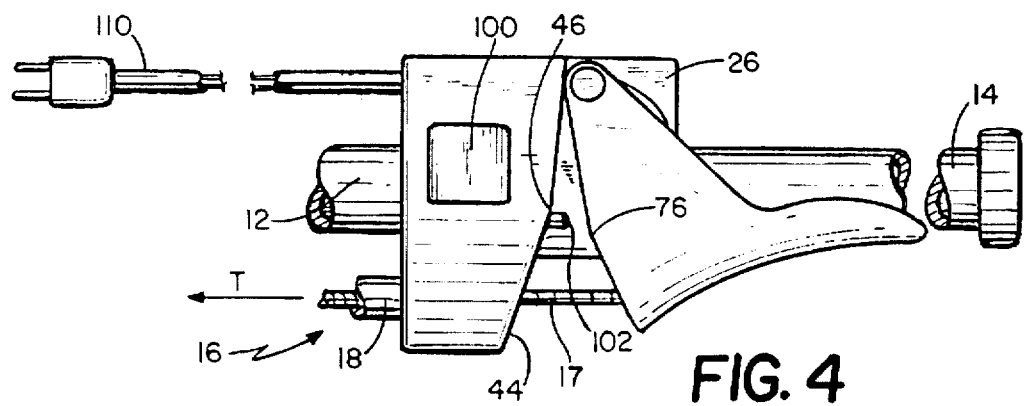
FIG. 4 is a side view of the throttle lever of FIG. 1, showing the throttle lever in its second range of motion.

As an operator of the vehicle applies force on the flange 68 at the end of the first range of motion, the pin 67 is urged against the abutment 39. If the operator continues to apply an increasing level of force, the lever arm will begin to pivot about the pin rather than about the fulcrum(s). The pin will then turn against the abutment, defining a second pivot axis about which the lever arm rotates through its second range of motion. As best seen in FIG. 4, the two confronting outer faces of the mounting block and the lever arm (40 and 70, respectively) are spaced away from one another during most of this second range of motion, with the distance between these two faces increasing from the beginning (FIG. 3) to the end (FIG. 4) of this second range. In one preferred embodiment, the top of the legs 64 of the lever arm are curved to ensure that the leg portions 74 of the lever arm's confronting face do not abut the legs 42 of the mounting block's confronting face and urge the pin 67 away from contact with the abutment 39.

In an alternative embodiment (not shown), the pin/abutment arrangement may be replaced by a construction which employs a second fulcrum spaced away from the first fulcrum described above. In this embodiment, the confronting face of either the lever arm or the mounting block (or both) is provided with a second fulcrum spaced away from the first fulcrum, or the first pair of fulcrums, depending on which embodiment is utilized. This second fulcrum is desirably spaced above the first fulcrum in FIGS. 1–6 and does not abut the opposite confronting face until the end of the first range of motion is reached. As an example, the leg portions 74 of the confronting face of the lever arm may abut the confronting face 40 of the mounting block before the pin contacts the end of the arcuate slot 38. If the leg portions 74 of confronting face 70 are provided with a second fulcrum, the lever arm would turn about the line of contact between this fulcrum and the confronting face of the mounting block rather than about the pin 67.

If so desired, more than two distinct ranges of motion may be provided by employing more than one fulcrum. In this embodiment, shown in FIG. 11, any number of additional fulcrums (e.g., the second fulcrum 78) may be formed on the confronting face of either the lever arm or the mounting block (or both). Each fulcrum 76, 78 would sequentially contact the opposite confronting face 40, with the point of contact between the mounting block and the lever arm shifting sequentially from one fulcrum to the next; each of these fulcrums would therefore define a separate range of motion. As explained below, the mechanical advantage provided by the lever arm is a function of the distance between the fulcrum and the cable. The mechanical advantage in the range of motion defined by each fulcrum therefore would also differ, with the mechanical advantage being greater about the first fulcrum 76 than about the second fulcrum 78.

Figure 12:
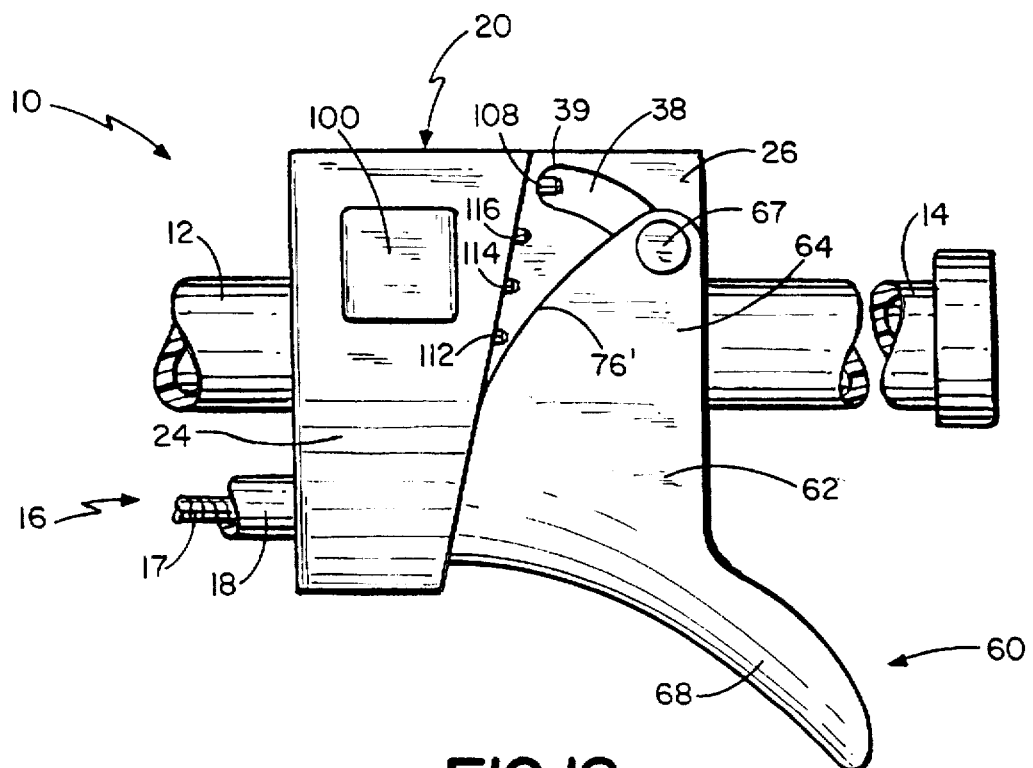
FIG. 12 is a side view of yet another alternative embodiment of a throttle lever of the invention shown in its idle position.

Alternatively, an elongate arcuate fulcrum, such as that shown in FIG. 12, may be used in place of the relatively narrow fulcrum shown in FIGS. 1–7. As noted above, if a curved fulcrum is utilized, the contact location between the fulcrum and the opposite confronting face will move along the surfaces of the fulcrum and the opposite confronting face, with the lever arm turning with respect to the mounting block about this shifting contact location. This essentially defines an infinite number of individual fulcrums about which the lever arm turns as the contact location moves along the surfaces of the elongate, arcuate fulcrum 76' and the opposite confronting face 40. As shown in FIG. 12, this embodiment may be used in conjunction with the pin/abutment arrangement described above so that the lever arm 60 turns about the arcuate fulcrum 76' through the first range of motion and pivots about the pin 67 through the second range. If so desired, however, the lever arm may turn about the arcuate fulcrum 76' through its entire range of motion, i.e., from its idle position to a position wherein the throttle is at its maximum opening, without pivoting about the pin.

Figure 11:
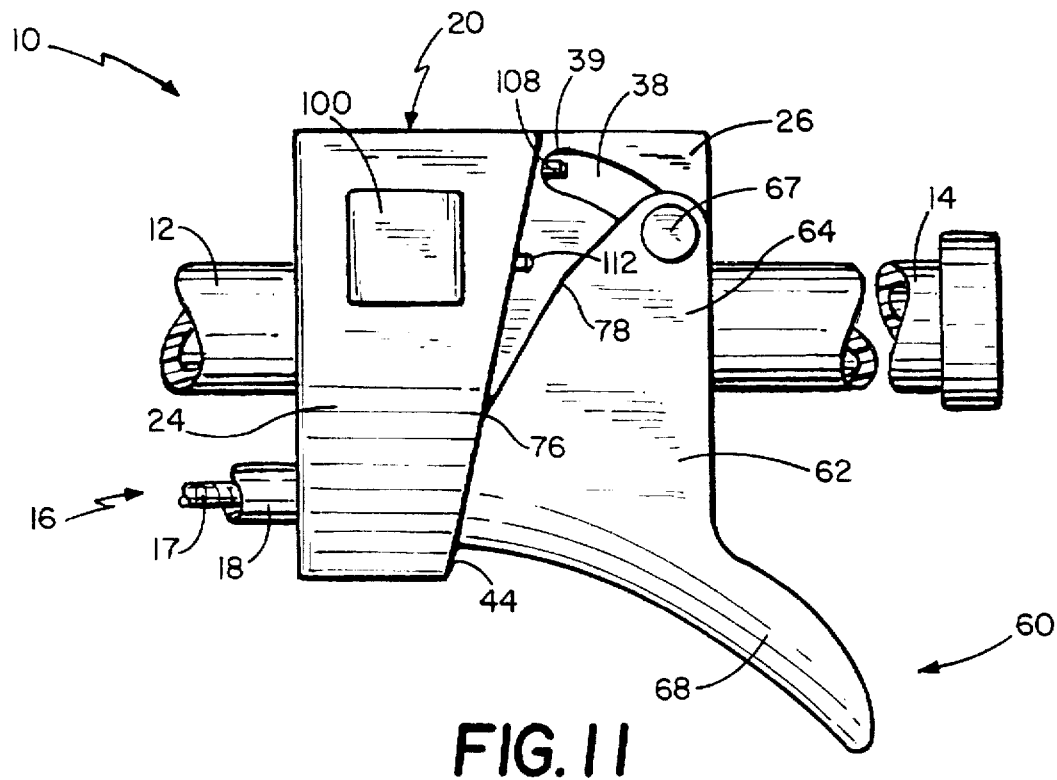
FIG. 11 is a side view of another alternative embodiment of a throttle lever of the invention shown in its idle position.

As noted above, the arcuate slot 38 in the lateral extension 26 of the mounting block is shaped to permit the pin to slide within the slot as the lever arm 60 turns about its contact with the confronting face 40 of the block. If a single angular fulcrum is employed, defining a pivot axis, the arcuate slot 38 may be spaced a constant distance radially outwardly of this pivot axis. If more than one fulcrum is used, as shown in FIG. 11, the slot will be spaced radially outwardly of each of the fulcrums, as each fulcrum defines a different pivot axis. If an elongate, arcuate fulcrum (76' in FIG. 12) is used, the slot 38 will still be spaced radially outwardly of the contact location between the fulcrum 76' and the opposite confronting face 40. However, the exact shape of this slot will depend on the geometry of the fulcrum 76', which determines the manner in which the contact location moves as the lever arm 60 turns.

As shown in FIG. 4, the outer end of the second range of motion, i.e., when the throttle is at its maximum opening, may be defined as the point at which the flange 68 of the lever arm abuts the handlebar 12. In a preferred embodiment, the flange is generally concave in shape and a portion of the handlebar may be received within this concave side of the flange. If so desired, the throttle lever may instead be provided with a stop, such as a formation jutting out of the side of the lateral extension 26, which limits rotation of the lever arm in a direction away from idle.

One purpose in providing the lever arm of the present invention with two distinct ranges of motion is to produce a different mechanical advantage in the lever arm in the two ranges. This behavior is clearly illustrated in FIG. 10, which depicts the force applied to the flange 68 of the lever arm 60 as a function of the distance which the core wire 17 of the bowden cable is displaced from the idle position. The scale of this graph is based on a preferred embodiment of the invention utilizing a throttle lever 10 substantially as shown in FIG. 7 in conjunction with a carburetor having a 34 mm cable travel from idle to full throttle.

In a prior art throttle lever which utilizes a single pivot pin, the force necessary to rotate the lever arm against the spring bias of the cable increases generally linearly as the lever arm is moved away from its idle position. This linear behavior is shown by the dashed line in FIG. 10. In this embodiment, such a prior art throttle requires a linearly increasing applied force which is directly proportional to the spring constant of the biasing spring of the carburetor. For instance, the embodiment tested required an initial force of about 2.8 pounds, which increased linearly to about 6 pounds at full throttle.

In the throttle lever shown in FIGS. 1–7, though, the fulcrum (or fulcrums) about which the lever arm turns is positioned relatively closely to the connection of the cable 16 to the lever arm while the pin 67 and abutment 39 are spaced farther away from this connection. In such a throttle, the force which the operator must apply to the flange in order to rotate the lever arm through the first range of motion is less than the force necessary to rotate the lever arm through the second range of motion.

Figure 10:
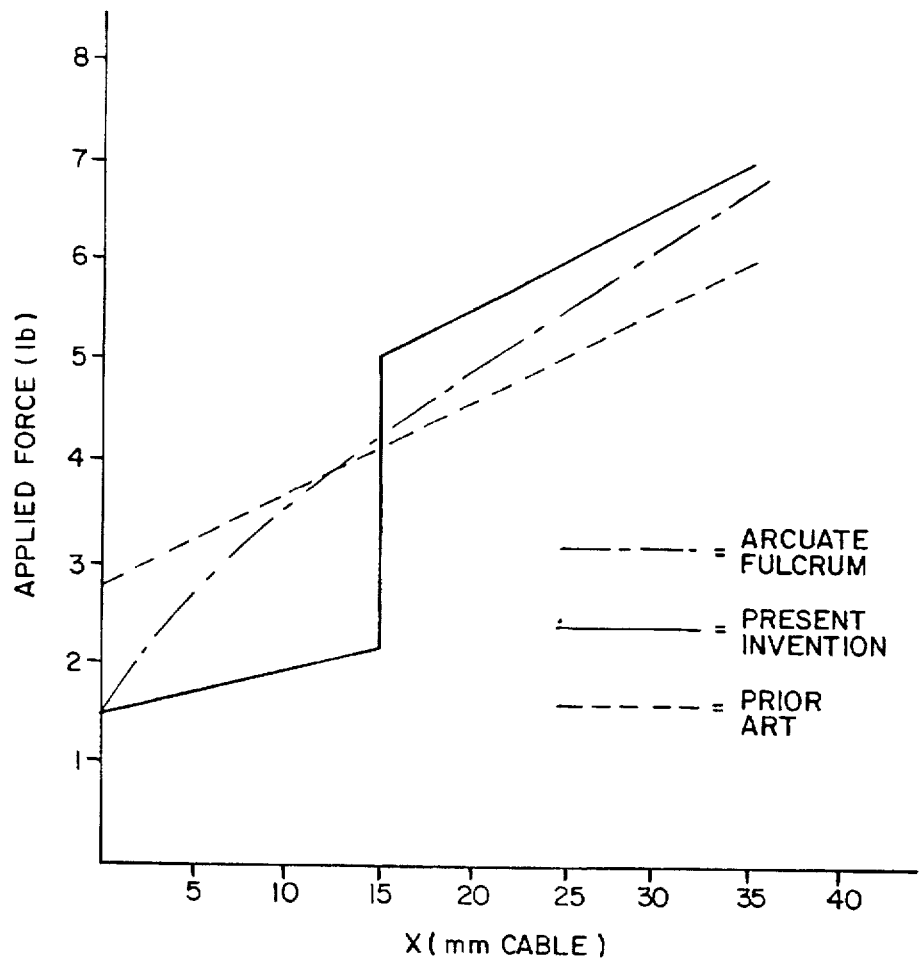
FIG. 10 is a graph of applied force vs. throttle cable travel comparing the behavior of a throttle of the invention and that of a prior art throttle.

In a preferred embodiment, the requisite force in the second range is significantly greater than that in the first range, and is desirably at least about twice the force necessary in the first range. As shown in FIG. 10, a throttle lever substantially as shown in FIG. 7 needs a linearly increasing force to move the cable through the first range of motion (about 0–15 mm of cable) and through the second range of motion (about 15 mm to full throttle, or about 34 mm). However, the plotted line is discontinuous, making a sudden, pronounced jump at the transition from the first to the second range of motion.

The greater the difference in the distance between the fulcrum and the cable, on the first hand, and between the pin 67 and the cable, on the other hand, the greater is the difference in mechanical advantage afforded the lever arm between these two ranges. For instance, in the embodiment shown in FIG. 7, the pin 67 is situated about twice as far from the cable as is the fulcrum 76, which means that about twice as much force is required to turn the lever arm about the pin at the beginning of the second range of motion than about the fulcrum at the end of the first range of motion. In the exemplary embodiment used to generate the graph of FIG. 10, the requisite applied force increased from about 1.5 pounds to about 2.2 pounds through the first range of motion, which is significantly less than the force requirement of the standard, prior art throttle. At the transition from the first to second range of motion, the necessary force jumps from about 2.2 pounds to about 5 pounds and increases more gradually to approximately 7 pounds at full throttle. Thus, the relatively abrupt change in the location of the point about which the lever arm pivots produces a perceptible change in mechanical advantage of the throttle lever.

If a less perceptible change in mechanical advantage is desired, the elongate, arcuate fulcrum 76' (described above in connection with FIG. 12) may be employed through the first range of motion. As noted above, the contact location between the fulcrum 76' and the opposite confronting face 40 moves along the surfaces of the arcuate fulcrum and the confronting face as the lever arm 60 is turned. As the contact location moves farther away from the cable, the mechanical advantage provided by the lever arm decreases substantially continuously. If the contact location at the end of the first range of motion is positioned adjacent the pivot axis of the second range of motion, there is essentially no perceptible change in mechanical advantage as the lever arm shifts from its first range of motion to its second range.

As noted above, such an elongate arcuate fulcrum 76' may be employed to provide a single range of motion of the lever arm 60 wherein the lever arm turns about the fulcrum 76' through its entire range of motion. As shown schematically by the dashed and dotted line in FIG. 10, the substantially continuously decreasing mechanical advantage produced by such a fulcrum provides a more gradual increase in necessary applied force than the embodiment of FIGS. 1–7 (solid line in FIG. 10) with its sudden increase in required force. The dashed and dotted line shown is simply shown for illustrative purposes; the precise shape of this curve will obviously depend upon the precise shape of the arcuate fulcrum, with a larger radius arc tending to more rapidly decrease the mechanical advantage of the lever arm.

It should be noted that in all cases the total work accomplished for a given throttle is the same regardless of the lever configuration. In other words, the area under each of the curves in FIG. 10 must be the same at the completion of the lever movement, wherein the throttle is at its maximum opening. The invention, therefore, provides a lower force requirement during initial lever travel, which is offset by a higher force requirement during later lever travel.

By providing the lever arm with a different mechanical advantage in each of two ranges of motion, the throttle lever is easier for an operator to use. The first range of motion, wherein the force necessary to rotate the lever arm is relatively low, moves the throttle between its idle position and an intermediate position. This intermediate position may permit the vehicle to move at approximately half of its maximum speed. Since, in certain vehicles, the speed at which an operator will normally cruise for extended periods of time is most commonly less than half of the maximum speed of the vehicle, the lower force requirements in this first range permit the operator to cruise for extended periods of time without experiencing a great deal of fatigue in the thumb used to manipulate the lever arm. Since an operator typically will only accelerate above this first range of speeds for relatively short periods of time, the additional force necessary to move the lever arm through its second range of motion should not be unduly tiresome, and the higher force required in the second range tends to reduce the likelihood of accidentally accelerating too fast.

Figure 8:
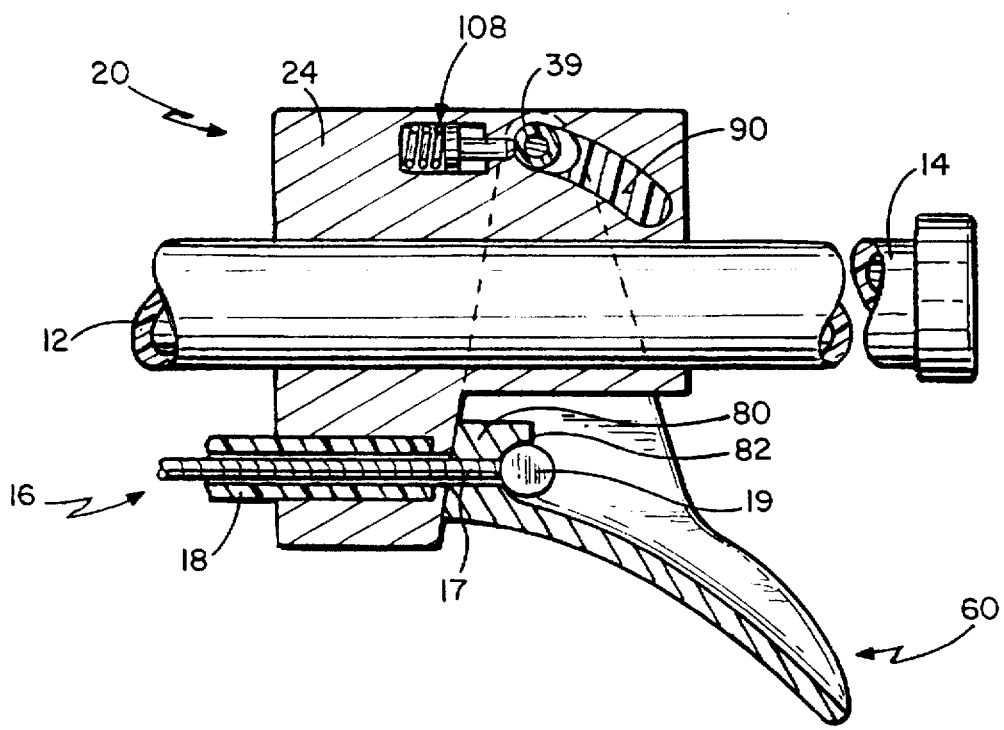
FIG. 8 is a cross-sectional view of the throttle lever of FIG. 7 converted for use as a standard throttle lever.

FIG. 8 shows a cross sectional view of the throttle lever of FIG. 7 converted for use as a standard prior art-type throttle lever. The mounting block 20 is the same mounting block shown in FIG. 7 and described above, but the operation of the lever arm 60' differs from that of the lever arm 60 shown in FIG. 7. The confronting face 40 of the mounting block is substantially planar and does not include a fulcrum; only the lever arm includes a fulcrum 76 in the embodiment shown in FIG. 7, as noted above. In order to permit the operator to convert the throttle lever of FIG. 7 to the embodiment shown in FIG. 8, the pin 67 may be only releasably attached to the lever arm 60 rather than being permanently affixed thereto. The operator may detach the pin and retract it from the arcuate slot 38 and the apertures (66 in FIG. 6B) in legs 64 of the lever arm and the lever arm may be removed from the mounting block.

After removing the lever arm 60, an insert 90 may be placed in the arcuate slot to fill substantially all of the slot except for a space left for the pin 67. A second lever arm 60' may then be placed on the mounting block. This lever 60' includes a pair of generally parallel legs (one of which is shown in phantom lines in FIG. 8) much like the first lever arm, and one leg is positioned on either side of the extension 26 of the mounting block. The pin may then be passed through apertures provided in these legs and through the space left in the arcuate slot 38 by the insert 90 and attached to the lever arm for operation.

The primary difference between these two lever arms 60 and 60' is that the confronting face 70 of the first lever arm 60 includes a fulcrum 76 while the confronting face of the second lever arm 60' is substantially planar. This planar face preferably abuts substantially the entire confronting face 40 of the mounting block, which also is planar, when the lever arm 60' is in its idle position (as shown). This eliminates the first pivot axis of the first range of motion presented by the fulcrum 76 included in the first lever arm 60, so the second lever arm 60' pivots only about a single pivot axis, i.e., the pin. The second lever arm 60' therefore operates in substantially the same manner as the lever arm of a standard throttle lever known in the art. If the operator wishes to convert the throttle lever back to two-stage operation according to the present invention, he or she may remove the pin and replace the first lever arm back on the mounting block in the same manner as outlined above.

In a preferred embodiment, a throttle lever of the present invention is provided with safety means for terminating operation of the engine. The safety means may simply comprise a manually activated kill switch 100 which is operatively connected to the engine of the vehicle and terminates engine operation when the operator depresses the switch. Such kill switches are well known in the art and need not be discussed in detail here.

As explained above, a vehicle's throttle or cable may become stuck in a position away from its idle position and not return to idle when the operator releases the lever arm. During normal operation, the cable is biased by a spring or the like which is provided in the throttle in the direction of arrow "T" in FIGS. 1–5. If the throttle becomes stuck, though, this spring will not continue to apply tension on the cable. Accordingly, in a particularly preferred embodiment, the safety means also includes means for detecting the level of tension on the cable 16 and automatically terminating engine operation if the tension is below a predetermined minimum level.

One preferred construction of such a safety means is shown in FIGS. 1–9 and 11–12. This safety means responds to pressure of the lever arm 60 against the mounting block 20. Since cable tension urges the lever arm against the mounting block, monitoring the pressure between the lever arm and the block provides a useful means of indirectly monitoring the tension in the cable and detecting when the throttle becomes stuck in an open position. The safety means includes first and second detectors (102 and 108, respectively) for monitoring the pressure of the lever arm against the block adjacent each of two locations. The first detector is desirably positioned adjacent the contact location between the lever arm and the mounting block as the lever arm moves through its first range of motion and the second detector may be similarly positioned adjacent the contact location between the lever arm and the block as the lever arm moves through its second range of motion. In the embodiments shown in FIGS. 1–7, for example, the first detector 102 may be positioned adjacent the location at which the fulcrum contacts the opposite confronting face while the second detector 108 may be positioned on the abutment 39 at a location near where the pin 67 engages the abutment.

In the alternative embodiment shown in FIG. 11, wherein a plurality of fulcrums are provided with each fulcrum defining a separate range of motion, a separate detector may be associated with each fulcrum and thus each range of motion. In the depicted configuration, a third detector means 112 may be positioned adjacent the location at which the second fulcrum 78 contacts the opposite confronting face 40. This ensures that a detector is positioned at the contact location between the lever arm 60 and the mounting block 20 as the lever arm is turned through each of the three ranges of motion, permitting the safety means to respond to the force of the arm against the block.

Similarly, when an elongate, arcuate fulcrum (76' in FIG. 12) is utilized, a detector or detectors must be positioned such that at least one detector can measure the force of the lever arm 60 against the mounting block 20 as the contact location moves (see above). In one embodiment, shown in FIG. 12, a series of separate detectors (112, 114, 116) is spaced along the opposite confronting face 40. The detectors should be positioned closely enough to one another to ensure that one detector is engaged before the lever arm disengages previous detector. Alternatively, a single detector (not shown) capable of responding to the pressure exerted by the lever arm throughout its first range of motion may be used. Such a detector may be elongate and extend along the confronting face 40 from the initial contact location (i.e., the lever arm is in its idle position) to the contact location at the end of the first range of motion.

Figure 5:
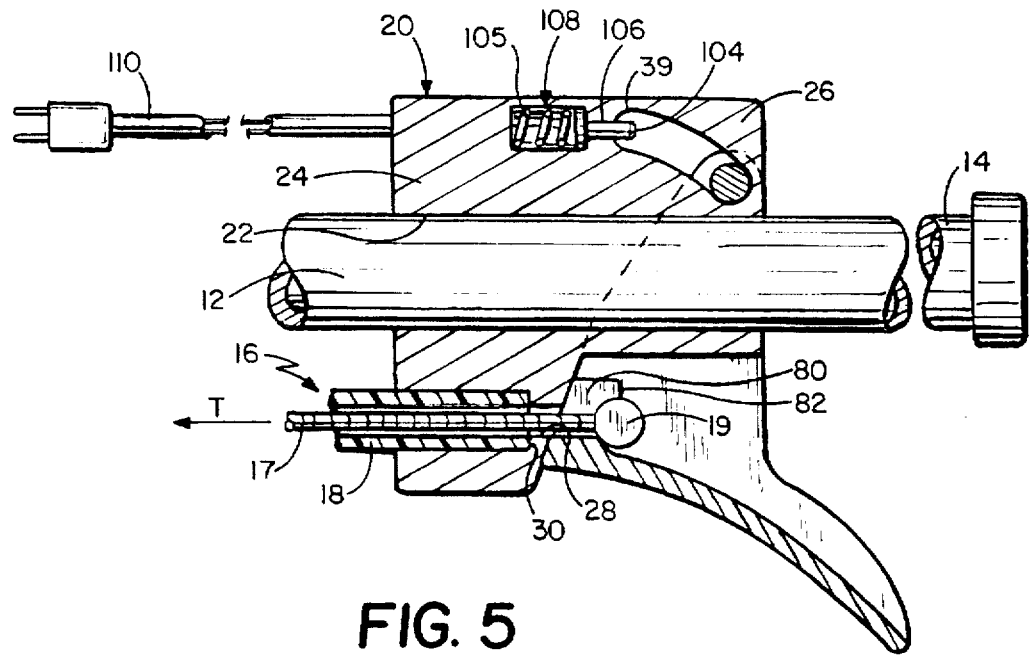
FIG. 5 is a cross-sectional view of the throttle lever shown in FIG. 2.

A wide range of detectors may be used in the present invention, but preferably commonly available micro switches may be employed (these are shown somewhat schematically in FIGS. 2, 5 and 8).

Each micro switch typically includes a spring-biased button 104 that extends through a reduced diameter portion 106 when the lever arm is disposed away from the detector (see, e.g., the second detector 108 shown in FIG. 5). When the lever arm is urged by the cable against the mounting block at a location adjacent the detector, the lever arm will exert a force against the button and keep it in its actuated position. For instance, in FIG. 2, the first detector 102 is positioned adjacent the point at which the fulcrums of the mounting block and the lever arm abut one another. In the idle position shown in this figure, the fulcrums substantially abut one another and the lever arm pushes the button to the left. If the tension applied to the cable by the throttle is too low, however, the lever arm 60 will be pushed away from the block 20 by the spring biased button 104.

Figure 9:
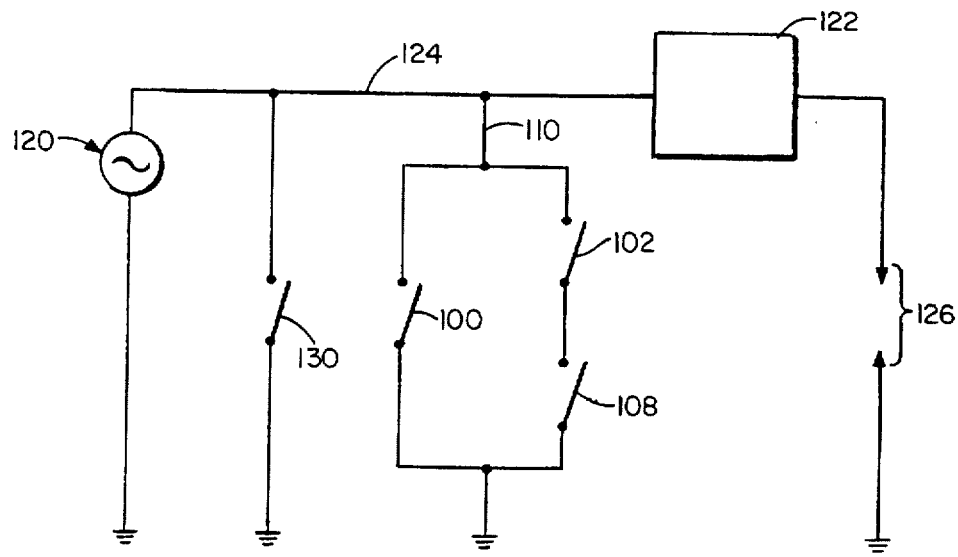
FIG. 9 is a schematic electrical diagram showing a preferred embodiment of a safety means for a throttle of the invention.

The safety means of the throttle lever is desirably operatively connected to the electrical system of the vehicle, such as by electrical wiring 110. FIG. 9 schematically depicts one preferred manner of connecting the safety means to the engine's electrical system. An electrical power source 120, which may comprise an alternator or the like, supplies power to the ignition control (depicted as a box 122) through line 124. Such ignition controls are well known in the art and generally serve to control the power supplied to the spark plug 126 to cause current to arc across the gap of the spark plug. A main ignition switch 130, which is commonly operated by a key to turn the vehicle on or off, may be connected to line 124 between the power supply 120 and the ignition controller 122. If the main ignition switch is closed, i.e., turned to its off position, the supply of power to the ignition controller is grounded, thus terminating engine operation.

Line 110 (which corresponds to the electrical wiring 110 in FIGS. 1–5) is attached to line 124 between the power supply 120 and the ignition control 122 and serves to selectively ground the electrical system. The safety means of the throttle lever is connected to the vehicle's electrical system through line 110. The first and second detectors each operate a normally closed switch (102 and 108, respectively) and these two switches are connected in series with one another. In the embodiments shown in FIGS. 1–8, the spring 105 will normally bias the button 104 toward a position corresponding to the closed condition of the switch. Only when the lever arm exerts sufficient force to depress the button will the switch be in its open position. During normal operation, at least one of these switches will be open because the lever arm will press against one or both of the buttons (depending upon which range of motion the lever arm is in) and open the associated switch. However, if there is not sufficient tension in the cable 16, the spring 105 of both of the detectors will push the buttons outwardly, closing both of the switches 102 and 108. This completes a circuit and connects line 110 to ground, thereby grounding the system and stopping the engine. The kill switch 100 is preferably connected in parallel to the switches operated by the detectors. If the operator manually depresses the kill switch 100, this will also ground the safety means and stop the engine.

While a preferred embodiment of the present invention has been described, it should be understood that various changes, adaptations and modifications may be made therein without departing from the spirit of the invention and the scope of the appended claims.

If an electrical system requiring electrical continuity to maintain engine operation is employed, however, all of the normally closed switches described above may be replaced with normally open switches placed in a parallel circuit arrangement (not shown) rather than the series arrangement shown in FIG. 9. The operation of such a system is substantially the same as described above except that insufficient tension in the cable will cause all of the switches to be in their open position, breaking the circuit and causing the engine to stop.

What is claimed is:

1. A throttle lever for remotely controlling a throttle of a vehicle comprising:

(a) a mounting block having means for attaching the block to the vehicle;
   (b) a cable; and
   (c) a lever arm having a manually engageable flange and means for receiving and retaining an end portion of the cable; the mounting block and the lever arm respectively having confronting outer faces, one of the confronting faces including a fulcrum for abutting the other confronting face through a first range of motion of at least about 16 degrees; one of the mounting block or the lever arm including a pin and the other of the mounting block or the lever arm including an arcuate slot, a portion of the pin being received in and slidable within the slot through the first range of motion and rotatable with respect to the slot through a second range of motion; said cable, when under tension during normal operation, biasing the lever arm toward an idle position wherein the confronting face of the lever arm abuts the confronting face of the mounting block, the fulcrum, pin and slot being located to provide mechanical advantage so that the force necessary to rotate the lever arm against the biasing force of the cable is less when the lever arm is pivoted through the first range of motion than when it is pivoted through a second range of motion.

2. The throttle of claim 1 wherein the lever arm pivots with respect to the mounting block through the first range of motion about a first pivot axis and through the second range of motion about a second pivot axis.

3. The throttle lever of claim 2 wherein the fulcrum is angular in shape, the fulcrum abutting the confronting face of the other of the mounting block or the lever arm through the first range of motion to define the first pivot axis.

4. The throttle lever of claim 2 wherein the arcuate slot includes an abutment which the pin may pivotally engage to define the second pivot axis.

5. The throttle lever of claim 1 wherein the fulcrum is spaced away from the confronting face of the other of the mounting block or the lever arm through the second range of motion.

6. The throttle lever of claim 1 wherein the fulcrum is formed on the confronting face of the lever arm and the confronting face of the mounting block is substantially planar.

7. The throttle lever of claim 1 wherein the fulcrum is formed on the confronting face of the mounting block.

8. The throttle lever of claim 6 wherein the first lever arm is detachable from the mounting block for replacement with a lever arm having a substantially planar confronting face.

9. A throttle lever for remotely controlling the throttle of a vehicle comprising a mounting block having means for attaching the block to the vehicle, a lever arm carried by the block, and a cable retained adjacent one end by the lever arm, the cable biasing the lever arm toward an idle position during normal operation; the lever arm including a manually engagable flange and being rotatable with respect to the mounting block against the biasing force of the cable through first and second ranges of motion in response to force applied to the flange, the first and second ranges of motion corresponding to first and second rangers of speeds of the vehicle; at least one of the mounting block and the lever arm including a fulcrum for abutting a confronting outer face of the other of the block or the lever arm as the lever arm is passed through the first range of motion, the fulcrum being spaced away from the confronting face through the second range of motion; the force applied to the flange necessary to rotate the lever arm through the first range of motion against the biasing force of the cable being less than the force necessary to rotate the lever arm through the second range of motion.

10. The throttle lever of claim 9 further comprising a pin carried by one of the mounting block or the lever arm and an arcuate slot formed in the other of the block or the lever arm, a portion of the pin being received in and slidable within the slot through the first range of motion.

11. The throttle lever of claim 10 wherein the arcuate slot includes an abutment which the pin may pivotably engage to define a pivot axis about which the lever arm may pivot through the second range of motion.

12. The throttle lever of claim 9 wherein the lever arm pivots with respect to the mounting block through the first range of motion about a first pivot axis and through the second range of motion about a second pivot axis.

13. The throttle lever of claim 12 wherein the fulcrum is angular in shape, the fulcrum abutting the confronting face of the other of the mounting block or the lever arm to define the first pivot axis.

14. The throttle lever of claim 12 further comprising a pin carried by one of the mounting block or the lever arm and an arcuate slot formed in the other of the block or the lever arm, a portion of the pin being received in and slidable within the slot through the first range of motion.

15. The throttle lever of claim 14 wherein the arcuate slot includes an abutment which the pin may pivotally engage to define the second pivot axis.

16. The throttle lever of claim 14 wherein the arcuate slot is spaced radially outwardly of the first pivot axis.

17. The throttle lever of claim 9 wherein the mounting block and the lever arm are both provided with a confronting face, the fulcrum being formed as a portion of at least one of the confronting face of the mounting block and the lever arm.

18. The throttle lever of claim 17 wherein the fulcrum is provided on the confronting face of the lever arm and the confronting face of the mounting block is substantially planar.

19. The throttle lever of claim 17 wherein the fulcrum is provided on the confronting face of the mounting block.

20. The throttle lever of claim 17 wherein the confronting face of the mounting block and the confronting face of the lever arm both include a fulcrum, the two fulcrums being positioned for abutting one another as the lever arm is passed through the first range of motion.

21. The throttle lever of claim 18 wherein the first lever arm is detachable from the mounting block for replacement with a second lever arm having a substantially planar confronting face and an insert positionable within the arcuate slot such that the second lever arm is pivotable with respect to the mounting block about only one pivot axis.

22. The throttle lever of claim 9 further comprising safety means for detecting tension in the cable and for terminating operation of an engine of the vehicle if said tension falls below a preselected minimum level.

23. The throttle lever of claim 22 wherein the safety means comprises first and second detector means for detecting pressure of the lever arm against the mounting block.

24. The throttle lever of claim 23 wherein the first detector means is adapted to detect pressure of the lever arm against the mounting block through the first range of motion, and the second detector means is adapted to detect said pressure through the second range of motion.

25. The throttle lever of claim 23 wherein the first and second detector means each comprise a spring-biased switch which opens and closes in response to pressure of the lever arm against the switch block.

26. The throttle lever of claim 23 wherein the first and second detector means each comprise an electrical switch which changes condition when the pressure of the lever arm against the mounting block falls below a predetermined minimum level, the first and second detector means being electrically connected to one another in series in an electrical circuit, the circuit being operatively connected to the engine to terminate operation of the engine only when both of the switches have changed condition.

27. A throttle lever for remotely controlling a throttle of a vehicle comprising a mounting block having means for attaching the block to the vehicle, a lever arm carried by the block, safety means for terminating operation of an engine of the vehicle, and a cable retained adjacent one end by the lever arm, the cable biasing lever arm toward an idle position and urging the lever arm against the mounting block during normal operation; the lever arm including a manually engagable flange and being rotatable with respect to the mounting block and against the biasing force of the cable through first and second ranges of motion in response to force applied to the flange, the first and second ranges of motion corresponding to first and second ranges of speeds of the vehicle; the lever arm contacting the mounting block adjacent a first contact location through the first range of motion and adjacent a second contact location through the second range of motion; the safety means including first and second detector means for determining whether the pressure of the lever arm against the mounting block exceeds a predetermined minimum level, the first detector means being positioned adjacent the first contact location and a second detector means being positioned adjacent the second contact location; the safety means terminating operation of the engine if the first and second detector means both indicate that the pressure of the lever arm against the mounting block is below said pre-determined minimum level.

28. A throttle lever for remotely controlling the throttle of a vehicle comprising amounting block having means for attaching the block to the vehicle, a lever arm carried by the block, and a cable retained adjacent one end thereof by the lever arm, the cable biasing the lever arm toward an idle position during normal operation; the lever arm including a manually engagable flange and being rotatable with respect to the mounting block against the biasing force of the cable in response to force applied to the flange; at least one of the mounting block and the lever arm including an elongate arcuate fulcrum for contacting a confronting outer face of the other of the block or the lever arm as the lever arm is passed through a range of motion; the contact location between the fulcrum and the confronting outer face moving along the surfaces of the fulcrum and the confronting face as the lever arm is passed through the range of motion such that the mechanical advantage provided by the lever arm decreases as the lever arm is passed through the range of motion.

29. The throttle lever of claim 28 further comprising a pin carried by one of the mounting block or the lever arm and an arcuate slot in the other of the mounting block on the lever arm, a portion of the pin being received in and slidable within the slot through the range of motion; the arcuate slot being spaced radially outwardly of the moving contact location between the fulcrum and the confronting outer face.

30. The throttle lever of claim 29 wherein the arcuate slot includes an abutment which the pin may pivotally engage to define a pivot axis about which the lever arm may pivot with respect to the mounting block through a second range of motion.

31. A throttle lever for remotely controlling a throttle of a vehicle comprising:

(a) a mounting block having means for attaching the block to the vehicle;

(b) a cable; and (c) a lever arm having a manually engagable flange and means for receiving and retaining an end portion of the cable; the mounting block and the lever arm respectively having confronting outer faces, each of the confronting faces including a fulcrum for substantially abutting the fulcrum of the other confronting face through a first range of motion of at least about 16°; one of the mounting block or the lever arm including a pin and the other of the mounting block or the lever arm including an arcuate slot, a portion of the pin being received in and slidable within the slot through the first range of motion and rotatable with respect to the slot through a second range of motion; said cable, when under tension during normal operation, biasing the lever arm toward an idle position wherein the confronting face of the lever arm abuts the confronting face of the mounting block; the fulcrum, pin and slot being located to provide mechanical advantage so that the force necessary to rotate the lever arm against the biasing force of the cable is less when the lever arm is pivoted through the first range of motion than when it is pivoted through a second range of motion.

* * * * *